United States Patent
Brand

(10) Patent No.: US 6,650,335 B2
(45) Date of Patent: Nov. 18, 2003

(54) METHOD FOR EXTRACTING STATIC AND DYNAMIC SUPER-RESOLUTION TEXTURES FORM A SEQUENCE OF IMAGES

(75) Inventor: Matthew Brand, Newton, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 359 days.

(21) Appl. No.: 09/790,839

(22) Filed: Feb. 22, 2001

(65) Prior Publication Data

US 2002/0113799 A1 Aug. 22, 2002

(51) Int. Cl.[7] ................................ G09G 5/00
(52) U.S. Cl. .................... 345/582; 345/419
(58) Field of Search ............... 345/582, 583, 345/588, 419, 427, 428, 473

(56) References Cited

U.S. PATENT DOCUMENTS

| | | | |
|---|---|---|---|
| 5,969,722 A | * 10/1999 | Palm | 345/420 |
| 6,047,088 A | * 4/2000 | van Beek et al. | 382/243 |
| 6,064,393 A | * 5/2000 | Lengyel et al. | 345/427 |
| 6,072,496 A | * 6/2000 | Guenter et al. | 345/419 |
| 6,504,546 B1 | * 1/2003 | Cosatto et al. | 345/473 |
| 6,525,728 B2 | * 2/2003 | Kamen et al. | 345/582 |

OTHER PUBLICATIONS

Barron et al., "The Feasibility of Motion and Structure from Noisy Time–Varying Image Velocity Information"; International Journal of Computer Vision, 5:3, pp. 239–269, 1990.

Heyden et al., "An Iterative Factorization Method for Projective Structure and Motion from Image Sequences"; Image and Vision Computing 17, pp. 981–991, 1999.

Stein et al., "Model–Based Brightness Constraints: On Direct Estimation of Structure and Motion"; IEEE Transactions on Pattern Analysis and Machine Intelligence, vol. 22, No. 9, pp. 992–1015, Sep. 2000.

Sugihara et al., "Recovery of Rigid Structure from Orthographically Projected Optical Flow"; Computer Vision, Graphics and Image Processing 27, pp. 309–320, 1984.

Waxman et al., "Surface Structure and Three–Dimensional Motion from Image Flow Kinematics"; The International Journal of Robotics Research, 4 (3), pp. 72–94, 1985.

* cited by examiner

Primary Examiner—Matthew Luu
(74) Attorney, Agent, or Firm—Dirk Brinkman; Andrew Curtin

(57) ABSTRACT

A method constructs a super-resolution texture from a sequence of images of a non-rigid three-dimensional object. A shape of the object is represented as a matrix of vertices, and a basis of possible deformations of the object is represented as a matrix of displacements of the 3D points, the matrices of 3D points and displacements form a model of the object in the video. A set of correspondences between the points in model and the object in the images is formed. The points in each image are connected using the set of correspondences to form a triangle texture mesh for each image. Each triangle mesh is warped to a common coordinate system while super-sampling texture in each image. The warped and super-sampled triangle meshes are averaged to produce the super-sampled texture of the object in the image.

7 Claims, 3 Drawing Sheets

$$\text{Pose} = \bigcirc \times \left(\begin{array}{c}\bigcirc\end{array}\right) + \left(\begin{array}{ccc}\bigcirc & \bigcirc & \bigcirc \\ \blacksquare & \blacksquare & \blacksquare\end{array}\right) + \nearrow$$

$$P = R \times (B) + (C \otimes I \quad D) + T$$

FIG. 2

METHOD FOR EXTRACTING STATIC AND DYNAMIC SUPER-RESOLUTION TEXTURES FORM A SEQUENCE OF IMAGES

RELATED APPLICATION

This application is related to U.S. patent application Ser. No. 09/791,117 "Modeling Shape, Motion, and Flexion of Non-Rigid 3D Objects Directly from a Sequence of Images," filed concurrently by Brand on Feb. 22, 2001.

FIELD OF THE INVENTION

The present invention relates generally to computer graphics, and more particularly to a method for extracting textures from a sequence of images.

BACKGROUND OF THE INVENTION

Texture-mapping is a well known method for adding detail to renderings of computer graphic scenes. During texture-mapping, textures are applied to a graphics model. The model typically includes a set of 3D points and a specification of the edges, surfaces, or volumes that connect the points. If the rendering is volumetric, e.g., the rendering represents a solid object and not just its surface, then the textures can be in 3D. Texture-mapping gives the illusion of greater apparent detail than present in the model's geometry. If the textures are extracted from photographs or images, the rendered images can appear quite realistic. Textures can be in the form of texture-maps, i.e., data, or texture-functions, i.e., procedures.

In general, textures and images are sparse samplings of a light field, typically, the reflected light from a surface. Digital images, including individual video frames, are fairly low-resolution samplings of reflectance. However, if there is motion in a sequence of images, then every image gives a slightly different sampling of the light field, and this information can be integrated over time to give a much denser sampling, also known as a super-resolution texture.

It is desired to provide super-resolution textures from a low-resolution sequence of images.

SUMMARY THE INVENTION

The method according to the invention extracts texture-maps and texture-functions, generally "textures," from a sequence of images and image-to-image correspondences. The extracted textures have a higher resolution and finer detail than the sequence of images from which they are extracted. If every image is annotated with control parameters, then the invention produces a procedure that generates super-resolution textures as a function of these parameters. This enables dynamic textures for surfaces or volumes that undergo appearance change, for example, for skin that smooths and pales when stretched and wrinkles and flushes when relaxed. These control parameters can be determined from the correspondences themselves.

In the following text the term "image" will be used for 2D or 3D arrays of data and "video" will be used for time-series of such arrays.

More specifically, the invention provides a method that constructs a super-resolution texture from a sequence of images of a non-rigid three-dimensional object. The object need not be non-rigid. A shape of the object is represented as a matrix of 3D points. A basis set of possible deformations of the object is represented as a matrix of displacements of the points. The matrices of 3D points and displacements form a model of the object in the video and its possible deformations. The points in the model are connected to form a triangle or tetrahedron mesh, depending on whether the images are 2D or 3D. For each image, a set of correspondences between the points in the model and the object in the image is formed. The correspondences are used to map the mesh into each image as a texture mesh. Each mesh, and the image texture the mesh covers, is warped to a common coordinate system, resulting in a texture that appears to be a deformation of the original image. The warp is done with super-sampling so that the resulting texture has many more pixels than the original image. The warped and super-sampled textures are averaged to produce a static super-sampled texture of the object in the image. Various weighted averages of the warped and super-sampled textures produce dynamic textures that can vary according to the deformation and/or pose of the object.

BRIEF DESCRIPTION OF THE DRAWINGS

FIG. 2 is a diagram of the equation which models the flexion and posing of the object.

DETAILED DESCRIPTION OF THE PREFERRED EMBODIMENTS

Figure 1:
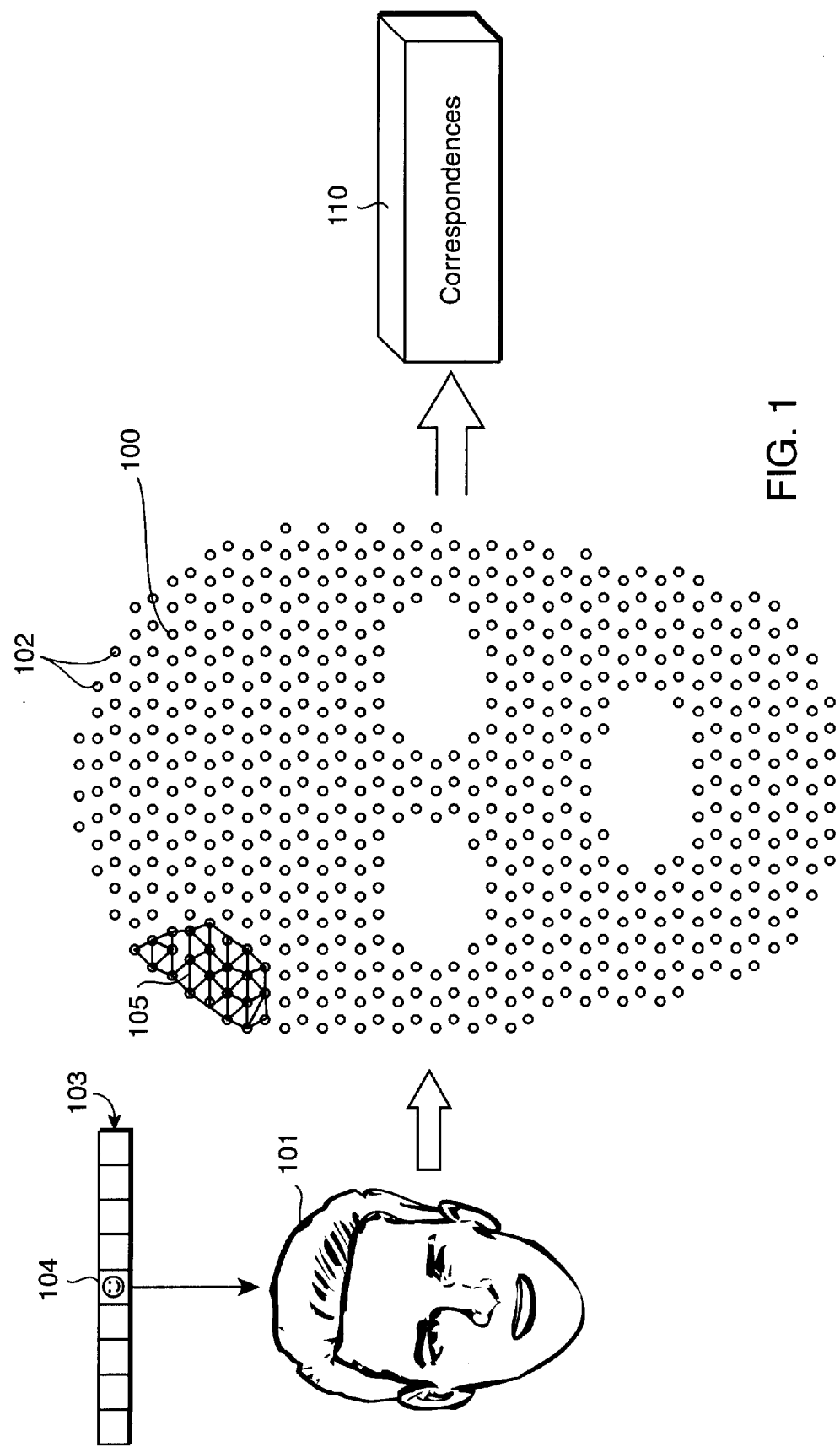
FIG. 1 is a diagram of an object modeled by a matrix of 3D vertices that can be displaced for changes in shape and pose.

As shown in FIG. 1, the invention expresses the shape of a model 100 of a non-rigid (flexible) object 101 in a sequence of images 103 by a matrix of points 102. The example object modeled is a face. It should be understood that the invention can also be used with volumetric (3D) models in a time series of 3D volume data sets, each data set, in effect being an "image" of the volume at an instance in time.

A set of correspondences 110 stores the locations of the points 102 of the model of the object 101 in every image 104 of the sequence of images 103. Each location can be expressed with 2D or 3D matrix coordinates. A number of computer vision techniques are known for determining the set of correspondences 110. In the preferred embodiment of the present invention, the set of correspondences 110 is obtained as described in U.S. patent application Ser. No. 09/791,117 "Modeling Shape, Motion, and Flexion of Non-Rigid 3D Objects Directly from Sequence of Images," filed concurrently by Brand on Feb. 22, 2001 herewith, and incorporated herein in its entirety.

Figure 3:
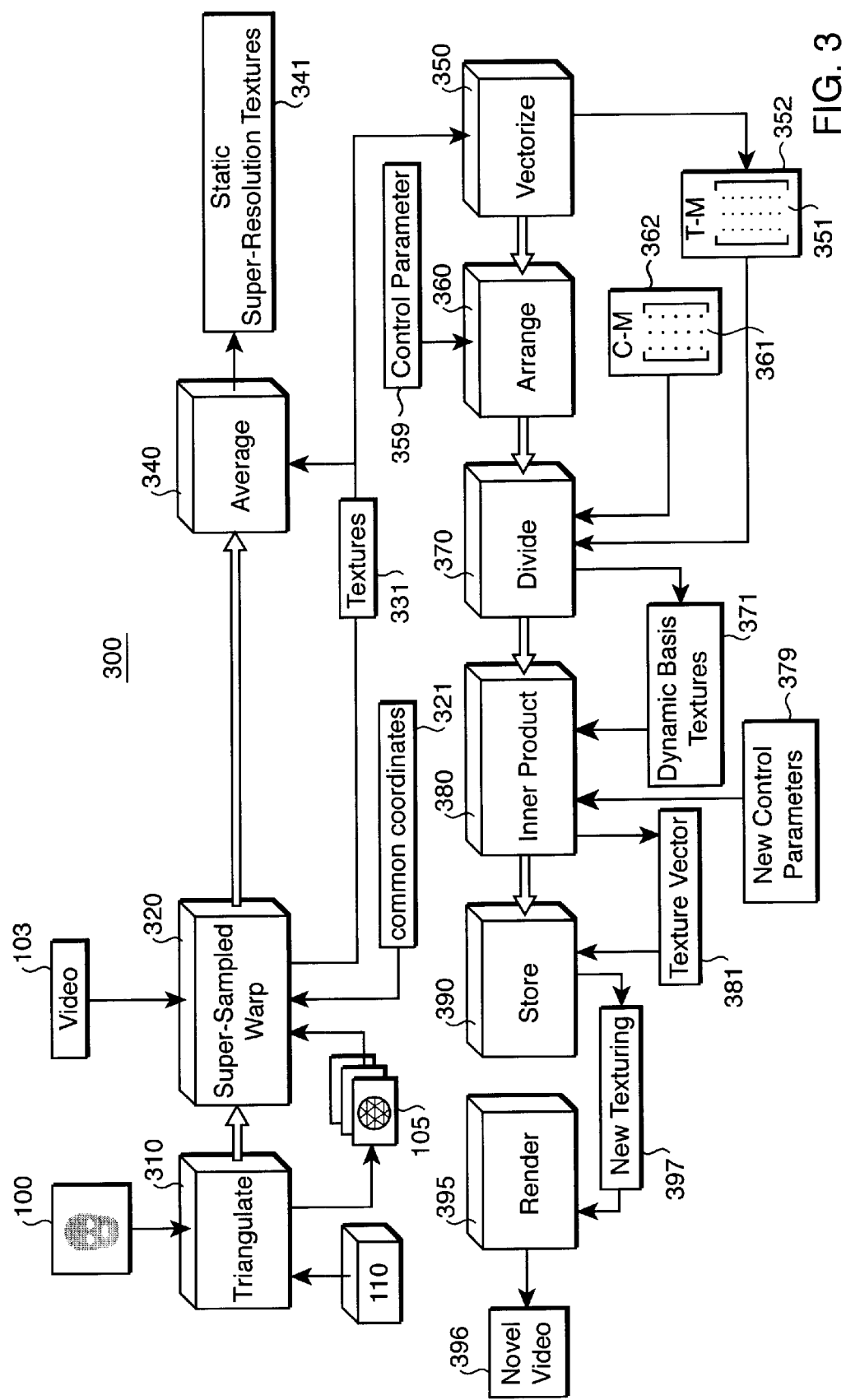
FIG. 3 is a flow diagram of a texture-mapping method according to the invention.

FIG. 3 shows a method for constructing static (top) and dynamic (bottom super-resolution textures according to the invention.

Static Super-Resolution Textures

As shown in the top-portion of FIG. 3, to construct static super-resolution textures 341 for the model 100, using the image-to-image correspondences 110, first connect 310 the points 102 of the model 100 to generate triangular texture surface meshes 105. Connecting the points turns them into vertices. For clarity, the triangle texture meshes 105 are only partially shown. In practice, the meshes 105 cover all parts of the model to be texture-mapped. The points 102 can be triangulated manually, or automatically via the well-known Delaunay process.

The set of correspondences 110 give the location of each triangle vertex in every image 104. To construct the super-resolution textures for each of the triangles, the texture contained in every image 104 of the sequence of images 103, within each corresponding triangle, is warped 320 to a common coordinate system 321.

In the course of warping 320, the texture from each image 104 is super-sampled to the desired texture resolution. The warped, super-sampled triangle-textures 331 for all images are then averaged 340 to produce the super-resolution textures 341. In the preferred embodiment, bilinear warps and Gaussian sampling kernels are used. But other sampling and warping techniques can also be used.

Note that this triangle-by-triangle process can be done on all triangles at once by warping the texture in each image 104 to a canonical positioning of the points 102, and the averaging 340. This canonical positioning is essentially the texture-coordinates of the vertices in the resulting texture-map.

Dynamic Textures

Many objects change surface appearance as they change shape (articulate). For example, the skin around the eyes and mouth wrinkles as the muscles underneath contract. These surface changes are usually too fine to be captured in the geometry of the model 100. However, they can be simulated by a dynamic texture-map that varies as a function of how the object articulates.

To do so, construct the warped super-sampled textures 331 of each image, as described for the top portion of FIG. 3. Then, as shown in the bottom portion, each such texture 331 is vectorized 350 and made into one column 351 of a texture-matrix (T-M) 352.

Control Parameters

Vectors of control parameters 359 are provided for each image 104. The control parameters model the changes of shape in the model 100, for example, the degree of muscle contraction, or other articulations of the model. The control parameters can be obtained from computer vision analysis of the sequence of images 103, or directly from the set of correspondences 110, for example as a low-dimensional representation of the correspondences such as can be obtained from a truncated principal components analysis (PCA). The control parameters can also be in the form of flexion vectors extracted from the sequence of images as described below.

The control parameters 359 for each image are arranged 260 similarly as columns 261 of a control matrix (C-M) 262. The control matrix 362 is then divided 370 into the texture matrix 352 to obtain a matrix 371 storing a basis set of textures. An inner product 380 of this matrix and any new control vector-parameter 379 yields a dynamic texture-vector 381 appropriate to that control setting. The texture-vector 381 is stored 390 into a texture-map buffer 391 and can be used to texture the appropriately deformed 3D model.

Note that this is a linear regression model that predicts texture from control parameters. However, any non-linear regression model that can be fitted to the texture and control pairs can be used instead.

Novel Video Formation

The above described method can also be used to render 395 a novel video 396 by using new textures 397. For example, an input sequence of images 103 of a frontal view of a talking head can be rendered as the novel video 396 where the head is viewed sideways, or at an oblique angle. Although the preferred method uses computer vision techniques, it should not be construed as the only way such information can be obtained from the sequence of images.

As shown in FIG. 2, the shape and motion, i.e., the projection or pose P 200, of a non-rigid 3D model 100 onto the image plane can be expressed by $$P = R_{2\times3}(B_{3\times n} + (C_{1\times k} \otimes I_3)D_{3k\times n}) \oplus T_{2\times 1}, \quad (1)$$

where R 201 is an orthographic projective rotation matrix, B 202 is the matrix of the 3D points 102, C 203 is a vector of flexions, i.e., deformation coefficients or control parameters 359, I is the identity matrix, D 205 is a matrix of k linearly separable deformations of the model, and T 206 is a 2D translation matrix. The deformations 203–205 are weighted by the flexion coefficients 207. The rotation matrix R drops the depth dimension, making the projection orthographic. If the basis set of deformations in D includes the base shape then the orthographic projection is scaled. Methods for determining these variables directly from the sequence of images are described in the related patent application by Brand, as cited above.

The parameters R, C, and T take on different values in every image. The parameters B and D are intrinsic to the physical object depicted by the sequence of images. Static texture recovery requires correspondences (P) to be determined for many images; dynamic texture also requires control parameters (C). The texture can be combined with the model (B, D) and a novel sequence of control (C) and motion (R, T) parameters to generate novel animations of the object with a high degree of realism. That is, the novel animations are different than those appearing in the input sequence of images. In addition, the super-resolution textures can be combined with the original control and motion parameters to resynthesize the original sequence of images at higher resolutions. Note that super-resolution resynthesis of the original sequence of images can be done directly from the textures and correspondences without reference to the above model or any 3D information.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

I claim:

1. A method for constructing a super-resolution texture from a sequence of images of a non-rigid three-dimensional object, comprising:

representing a shape of the object as a matrix of 3D points, and a basis of possible deformations of the object as a matrix of displacements of the 3D points, the matrices of 3D points and displacements forming a model of the object in the sequence of images;

determining a set of correspondences between the points in the model and the object in the images;

connecting the points in the model to form a mesh;

warping, for each image, the mesh to a common coordinate system while super-sampling texture in each image covered by the mesh; and averaging the super-sampled textures covered by the warped meshes to produce the super-resolution texture of the object in the image.

2. The method of claim 1 wherein the set of correspondences is obtained directly from the sequence of images.

3. The method of claim 1 wherein the points are connected by a Delaunay process.

4. The method of claim 1 wherein the warping is bilinear, and the super-sampling uses a Gaussian sampling kernel.

5. The method of claim 1 further comprising:

vectorizing each super-sampled texture as a column in a texture matrix;

providing, for each image, a vector of control parameters for the mesh as a column in a control matrix;

dividing the control matrix into the texture matrix to obtain a basis matrix;

forming an inner product of the basis matrix and a vector of new control parameter to obtain a new texture-vector.

6. The method of claim 5 further comprising:

generating a new texture matrix from the new texture-vector; and applying the new texture-matrix to the model while deforming the model to obtain a new image of the object.

7. The method of claim 1 further comprising:

resynthesizing the sequence of images using the super-resolution texture.

* * * * *